(12) United States Patent
Mentink

(10) Patent No.: US 6,422,636 B2
(45) Date of Patent: Jul. 23, 2002

(54) DRIVE ASSEMBLY FOR A MOVEABLE VEHICLE COMPONENT

(75) Inventor: Laurentius A. G. Mentink, Haaksbergen (NL)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 09/726,083

(22) Filed: Nov. 29, 2000

(30) Foreign Application Priority Data

Dec. 3, 1999 (NL) .............................................. 1013743

(51) Int. Cl.⁷ .................................................. B60J 7/00
(52) U.S. Cl. ............................ 296/107.01; 296/107.09; 296/112; 74/625
(58) Field of Search ....................... 296/107.01, 107.09, 296/112, 115, 117; 74/625

(56) References Cited

U.S. PATENT DOCUMENTS

| | | | | |
|---|---|---|---|---|
| 4,367,454 A | * | 1/1983 | Modica ........................ | 340/63 |
| 4,702,094 A | * | 10/1987 | Peterson ....................... | 70/241 |
| 5,524,953 A | * | 6/1996 | Shaer .......................... | 296/100 |
| 5,584,522 A | * | 12/1996 | Kerner et al. ............. | 296/37.16 |
| 5,816,644 A | * | 10/1998 | Rothe et al. ................. | 296/107 |
| 5,825,147 A | | 10/1998 | Porter et al. ................. | 312/466 |
| 5,927,794 A | * | 7/1999 | Mobius et al. ............ | 296/146.1 |

FOREIGN PATENT DOCUMENTS

| | | |
|---|---|---|
| DE | 3826789 A1 | 2/1990 |
| EP | 0 842 803 A1 | 11/1997 |

OTHER PUBLICATIONS

Search Report of NL Appln. No. 1013743, dated Dec. 3, 1999 (with English translation).

* cited by examiner

Primary Examiner—Joseph D. Pape
Assistant Examiner—Lori L Coletta
(74) Attorney, Agent, or Firm—Quarles & Brady LLP

(57) ABSTRACT

A drive assembly for driving a moveable component of a vehicle in which the component can adopt one or more positions in which the component prevents access to the vehicle or a part of the vehicle. The drive assembly has an actuator which is coupled to the component and provides the force for moving the component, and a control unit for actuating the actuator. In an emergency operating mode, the actuator can move freely in at least one direction, in such a manner that the actuator allows movement of the component caused by an external force being exerted on the component other than by means of the actuator, preferably by hand. The drive assembly is also provided with a theft detection unit for detecting theft or attempted theft of the vehicle or of goods which are present in the vehicle. The theft detection unit is coupled to the control unit. The drive assembly is designed so that if the assembly is in the emergency operating mode and the moveable component is in a position in which the component prevents access to the vehicle or a part of the vehicle, and then the theft detection unit detects theft or attempted theft, the emergency operating mode of the drive assembly is cancelled, and the drive assembly is then moved into a blocking mode, in which free mobility of the actuator is cancelled and the actuator blocks movement of the component caused by an external force being exerted on the component.

11 Claims, 3 Drawing Sheets

DRIVE ASSEMBLY FOR A MOVEABLE VEHICLE COMPONENT

BACKGROUND OF THE INVENTION

The present invention relates to a drive assembly for a moveable vehicle component of a vehicle, which component can adopt one or more positions in which the component prevents access to the vehicle or a part of the vehicle. The drive assembly comprises an actuator, which is coupled to the component and provides the force for moving the component, and a control unit for controlling the actuator. The drive assembly has an emergency operating mode, in which the actuator can move freely in at least one direction, in such a manner that the actuator allows movement of the component caused by an external force being exerted on the component other than by the actuator, preferably by hand. The drive assembly also is provided with theft detection means for detecting theft and/or attempted theft of the vehicle and/or of goods which are present in the vehicle, and the theft detection means is coupled to the control unit. The invention also relates to a method for preventing unauthorized access to a part of a vehicle.

DISCUSSION OF THE PRIOR ART

A drive assembly is known, for example, from DE 38 26 789, which describes a motor vehicle of the convertible type having a folding-roof installation. The folding-roof installation has a plurality of moveable components, such as the main bow, the rear bow, the tonneau cover and various locks. These components can each adopt one or more positions in which the corresponding component prevents access to the vehicle or a part of the vehicle. These moveable vehicle components are not operated by hand, but rather by means of associated hydraulic actuators. The electromagnetically operated valves which belong to these actuators—if there is no electrical energizing current being fed to the said valves—connect the chambers of the actuators to the hydraulic fluid reservoir. As a result, it is possible, in the event of a fault, to move the components of the folding-roof installation by hand.

The known drive assembly has an emergency operating mode in which the actuators can move freely, in such a manner that the actuators allow movement of the components of the folding-roof installation caused by an external force being exerted on the corresponding component other than by the actuators, in particular by hand. This emergency operating mode is desirable in particular in order to allow the folding-roof installation to be moved by hand in the event of a fault, for example a loss of electric voltage or a fault in the associated control unit.

U.S. Pat. No. 5,825,147 describes a motor vehicle of the convertible type in which the components of the folding-roof installation are operated by means of associated electromechanical actuators, the action of which is actuated by a control unit. The control unit is coupled to position sensors which detect the position of the moveable components, so that, for example, it is possible to prevent a collision between the moveable components. The control unit is also coupled to theft detection means, in particular in order to notify the theft detection means that the folding roof is fully closed or open.

Vehicles of the convertible type are often of striking appearance and also relatively expensive, and consequently vehicles of this type are undesirably often the target of theft of the vehicle itself or from the vehicle and/or break-ins.

SUMMARY OF THE INVENTION

The object of the present invention is to propose measures which provide improved protection against theft/break-ins.

To this end, the present invention provides a drive assembly which is designed in such a manner that, if this assembly is in the emergency operating mode and the moveable component is in a position in which the component prevents access to the vehicle or a part of the vehicle, and then the theft detection means detect theft or attempted theft, the emergency operating mode of the drive assembly is cancelled, and the drive assembly is then moved into a blocking mode, in which the free mobility of the actuator is cancelled and the actuator blocks movement of the moveable vehicle component coupled to it caused by an external force being exerted on the component.

The invention is based on the insight that the emergency operating mode, which is per se extremely desirable, often makes it relatively easy for a thief to gain access to the vehicle or a part of the vehicle, for example the boot.

The inventive idea is therefore to couple the theft detection means to the control unit of the actuator in such a manner that, if an (attempted) theft is observed, the free mobility of the actuator which is connected to the relevant component is cancelled and the said actuator is blocked, so that the component is also blocked and therefore cannot be moved (or can be moved no further) in order to gain access to the vehicle.

In the drive assembly which is known from DE 38 26 789, the invention can be realized by energizing one or more valves of the hydraulic system in the event of an (attempted) break-in so that the said valve or valves close and it is impossible for any hydraulic fluid to flow out of the actuator(s).

In the drive assembly which is known from U.S. Pat. No. 5,825,147, in which electric motors are used to drive the components of the folding-roof installation, the invention could, for example, be realized by short-circuiting the windings of the said motors or by making the motors operate in the event of an (attempted) break-in.

In an advantageous embodiment, the theft detection means comprise a position sensor which is designed to recognize the position of the moveable vehicle component and is at least designed to recognize whether it is leaving its position in which the relevant component prevents access to the (part of the) vehicle. This design is particularly advantageous if the position sensor is coupled not only to the theft detection means but also to the control unit for actuating the actuator.

In an embodiment which is simple in practice, the position sensor is a switch which is arranged on the actuator, which is designed to recognize whether the actuator adopts its position which corresponds to the access-preventing position of the corresponding component. If the corresponding component is then moved towards the position in which access to the (part of the) vehicle is possible, and the actuator coupled thereto therefore leaves its abovementioned position, the switch passes this fact on to a theft detection unit, which can determine, partly on the basis of this information, whether or not a theft is being attempted.

Particularly if a position sensor is being used to detect the theft, as explained above, it is also preferable for the actuator, in the blocking mode, to passively or actively drive the corresponding component towards the position in which access to the (part of the) vehicle is prevented. This is because the detection is then based on the component being displaced in the direction of the access-enabling position, so that a crack can already have appeared, into which a thief can, for example, place a piece of a tool.

BRIEF DESCRIPTION OF THE DRAWINGS

Advantageous embodiments of the vehicle according to the invention will be explained in more detail below with reference to the drawing, in which.

DETAILED DESCRIPTION OF THE PREFERRED EMBODIMENTS

Figure 1:
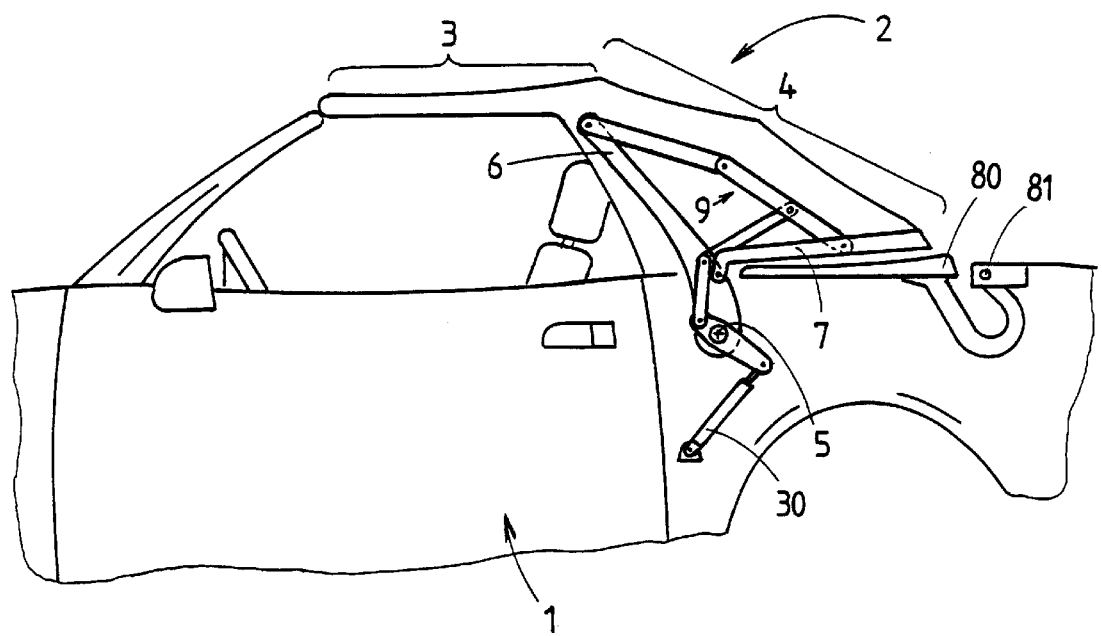
FIG. 1 diagrammatically depicts a partial side view of a vehicle having a folding-roof installation provided with a drive assembly according to the invention.

A passenger car 1 of the convertible type, only part of which is illustrated in FIG. 1, has a hydraulically driven folding-roof installation 2. The folding-roof installation 2, part of which is shown in detail in FIG. 2, comprises a front roof part 3, a rear roof part 4, and a main bow 6 which can pivot about a pivot axis 5. A fabric-tensioning bow 7, which is U-shaped when viewed from above, is connected to the main bow 6 in such a manner that it can pivot about a pivot axis 8 which runs parallel to the axis 5. The fabric-tensioning bow 7 is used to move the rear part 4 of the folding roof. On both sides of the car 1 there is a buggy link system 9 which is used to move the fabric-tensioning bow 7.

Each buggy link system 9 comprises two links 9a, 9b. At point 10, these links 9a and 9b are interconnected in such a manner that they can pivot about an axis which is substantially parallel to the axes 5 and 8. Furthermore, at its top end the link 9a is pivotably connected to attachment point 11 of the main bow 6, and at its bottom end the link 9b is pivotably connected, at point 12, to the fabric-tensioning bow 7.

An actuator for the buggy link system 9, in this case in the form of a double-acting hydraulic cylinder 30, is positioned in each side of the body of the car 1, which cylinders 30 are connected in parallel.

The cylinder 30 has a cylinder housing inside which a piston/piston-rod assembly 31 can move in a reciprocating manner, this assembly inside the housing delimiting two separate, variable working chambers 32, 33. In drive terms, the piston rod 31 is coupled to the buggy link system 9, and the buggy link system 9 can be moved between an extended position, in which the links 9a and 9b of this assembly are substantially in line with one another (FIGS. 1 and 2) and thus press the fabric-tensioning bow 7 downwards, and a folded position, in which the links 9a and 9b are at an angle to one another (not shown, the fabric-tensioning bow 7 is then adjacent to the main bow 6).

The drive coupling between the cylinder 30 and the buggy link system 9 is in this case formed by a link mechanism, an advantageous embodiment of which is shown in the drawing.

The link mechanism comprises a lever 16 which can pivot about a pivot axis 17 which coincides with the pivot axis 5 of the main bow 6. The cylinder 30 engages on the lever 16 on one side of the pivot axis 17, and on the other side of the pivot axis 17 the lever 16 is pivotably connected, at point 18, to an intermediate link 19. This intermediate link 19 is in turn pivotably connected, at pivot axis 20, to a subsequent link member 21. This link member 21 is pivotably connected to a point 22 on link 9b of the buggy link system 9 and extends towards the pivot axis 5 of the main bow 6.

A spacer member 23 is pivotably connected to the pivot axis of the fabric-tensioning bow 7 and to the pivot axis 20 between the intermediate link 19 and the link member 21 which is connected to the buggy link system 9.

Figure 2:
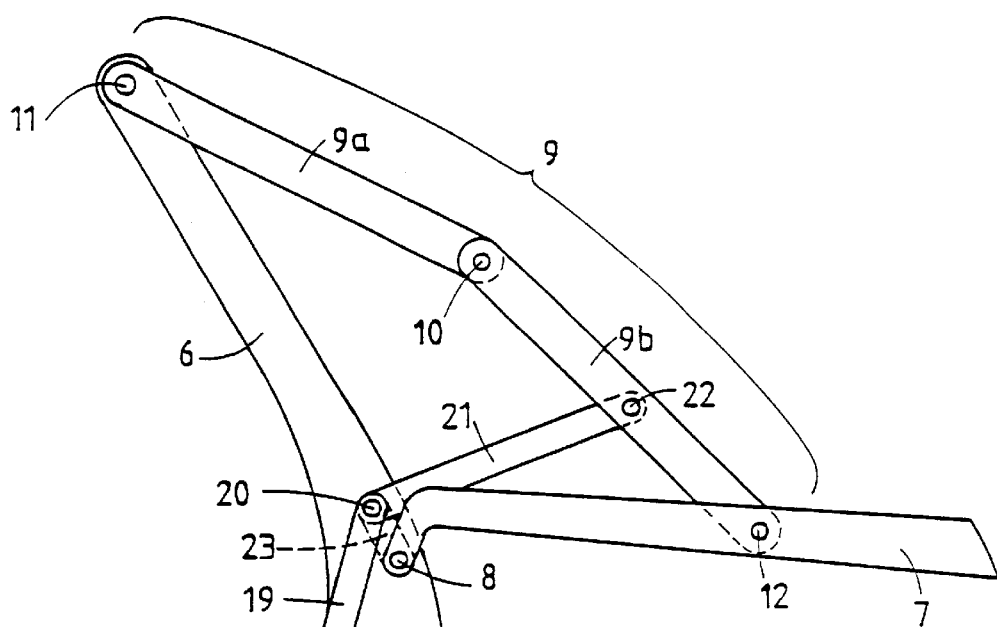
FIG. 2 diagrammatically depicts that part of the vehicle shown in FIG. 1 which is relevant to the explanation of the present invention, and FIGS. 3a–c diagrammatically depict a partial side view of another vehicle having a folding-roof installation provided with a drive assembly according to the invention, the folding-roof installation being shown in three different positions.
Figure 2:
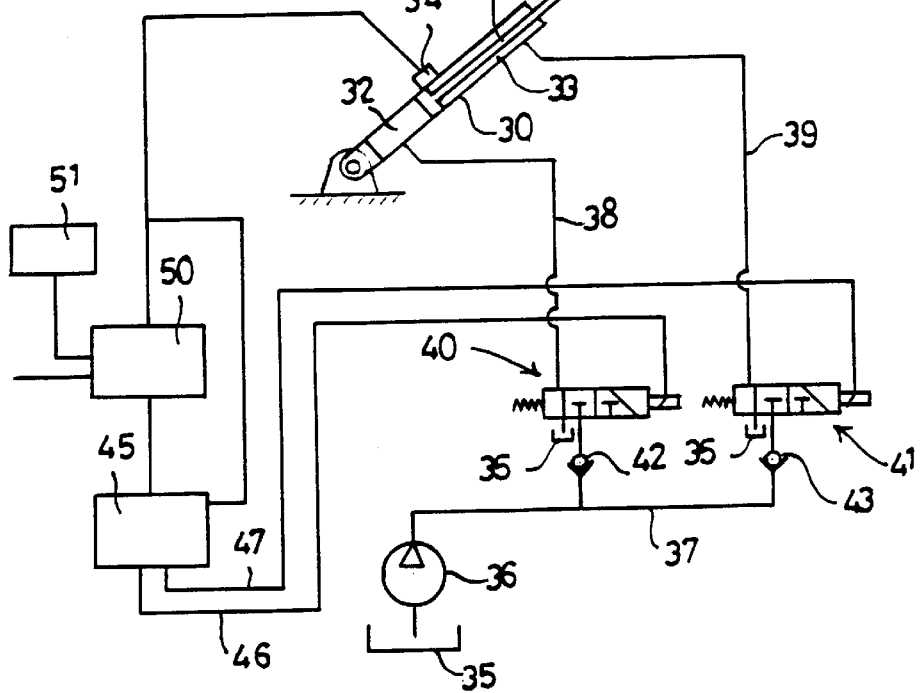

As a result of pressurized hydraulic fluid being fed to the chamber 32, the piston rod 31 will extend outwards with respect to the position shown in FIG. 2, and the links 9a and 9b are moved from the position in which they are shown into the position in which they are angled with respect to one another. As a result, the fabric-tensioning bow 7 will pivot towards the main bow 6.

In FIG. 2, the links 9a and 9b are in a position which can be referred to as the locked position which has been reached by moving the links through the dead centre. This position can be achieved by suitably selecting the transmission mechanisms. In this position, the fabric-tensioning bow 7 is locked.

On the cylinder 30 there is a limit switch 34 which is designed to recognize whether the piston rod 31 has adopted its limit position associated with the closed position (FIG. 2) of the folding roof.

FIG. 1 also shows a tonneau cover 80 which is used to cover a compartment in which the folding roof 2 is situated when the roof is fully open. To pivot the cover 80 upwards and downwards, about associated axis 81, separate drive means are provided. The movement of the main bow 6 is also brought about by separate drive means, for example a set of hydraulic cylinders.

FIG. 2 also shows a reservoir 35 for hydraulic fluid, as well as an electrically powered pump 36. The pump 36 can supply pressurized hydraulic fluid to pressure line 37, to which a branch line 38 leading to the chamber 32 and a branch line 39 leading to the chamber 33 are connected. An actuable control valve 40, 41 is incorporated in each branch line 38, 39. The valves 40, 41 are electromagnetically operated spring-return 3/2 control valves which, in the unenergized state, connect the relevant chamber of the cylinder 30 to the reservoir 35 and, in the energized state, to the pressure line 37. Between each of the valves 40, 41 and the pressure line 37 there is a non-return valve 42, 43 which in each case closes in the direction towards the pressure line 37.

To control the valves 40, 41 and the pump 36, an electronic control unit 45 is provided which, via signal lines 46, 47, is in communication with the valves 40, 41.

In the unenergized state, the valves 40, 41 connect the chambers 32, 33 of the cylinder 30 to the reservoir 35 in order to allow emergency operation of the folding roof. The piston/piston-rod assembly 31 can then move freely in both directions inside the housing of the cylinder 30.

If the vehicle 1 is parked and locked with the folding roof in the closed position, the valves 40, 41 will be unenergized and will be in their position in which the chambers 32, 33 are connected to the reservoir 35, so that the emergency operating mode is active. However, fabric-tensioning bow 7 is locked on account of the through dead centre position of the links 9a and 9b which is shown in FIG. 2.

If a strong force is exerted on the links 9a and/or 9b by hand or in some other way, for example by pressing hard on the fabric of the folding roof from the outside at a specific location, however, in some known convertible vehicles which are provided with a buggy link system of this nature, it has proven possible for thieves to push the links 9a, 9b back through the dead centre, so that the buggy link system 9 becomes unlocked. This makes it easy for the thief to enter the vehicle.

The vehicle according to the invention is provided with measures for preventing this method of theft.

The vehicle is provided with a theft detection unit 50 which is coupled, inter alia, to apparatus 51 for switching the unit 50 on and off. By way of example, apparatus 51 is the ignition lock of the vehicle or a separate (remotely operated) switch.

The theft detection unit 50 is coupled to the limit switch 34 and to the control unit 45. Incidentally, the limit switch 34 is also directly coupled to the control unit 45, in particular to detect when the piston rod 31 has reached its position shown in FIG. 2, as part of the monitoring and control of the sequence of movements of the folding roof.

Now imagine that, starting from the position shown in FIG. 2, a thief attempts to press the buggy link system 9 through the dead centre, in order to open the folding roof 2. In that case, the limit switch 34, even before the links 9a, 9b have been pressed through their dead centre, will detect that the piston rod 31 is leaving the limit position, and this recognition is transmitted to the switched-on theft detection unit 50. On the basis of this recognition, the theft detection unit 50 will command the control unit 45 to cancel the emergency operating mode. This is achieved through at least the valve 41 being energized, so that it is impossible for any hydraulic fluid to flow out of the chamber 33, since the non-return valve 43 prevents this flow. The cylinder 30 then immediately blocks further movement of the buggy link system 9, and consequently the attempted theft will fail. It is also possible for the valve 40 to be energized in response to the theft detection, so that the cylinder 30 is locked in both directions.

On account of the elasticity of the lines 38, 39, which are generally hydraulic hoses, and of the hydraulic fluid, when the external force ceases to be exerted on the folding roof, it will be possible to detect the buggy link system 9 being returned to the position shown in FIG. 2. This leads to the switch 34 again detecting that the piston rod 31 has adopted its limit position, and this recognition is again notified to the unit 50. Energizing of the valve 41 can then be cancelled again.

In a variant, it is possible for the energizing of the valve 31 to be cancelled only after a waiting period, for example of a few minutes, has elapsed.

In a variant, it is conceivable for the pump 36 to be placed in operation in order to actively extend the piston rod 31 and thus move and/or hold the buggy link system 9 in(to) the position shown in FIG. 2.

The theft detection means may be integrated with the control unit of the folding roof. In a simple embodiment, the theft detection means comprise nothing more than a routine in the computer program of the control unit 45, which detects the status of, for example, the ignition lock 51 of the vehicle, the position of the folding roof 2 and the status of the limit switch 34.

In another variant, the emergency operating mode is cancelled as soon as someone is close to the vehicle or, if the folding roof is open, is bending over the vehicle in order to look into the passenger compartment. Therefore, it is not necessary for an actual break-in to occur before the emergency operating mode is cancelled.

The fact that the invention may also apply, for example, to a vehicle with an open folding roof will now be explained briefly with reference to FIGS. 3a–c.

Figure 3A:
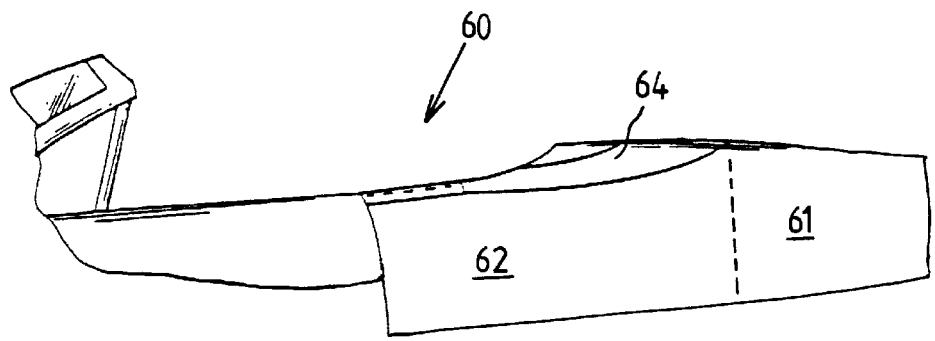
Figure 3B:
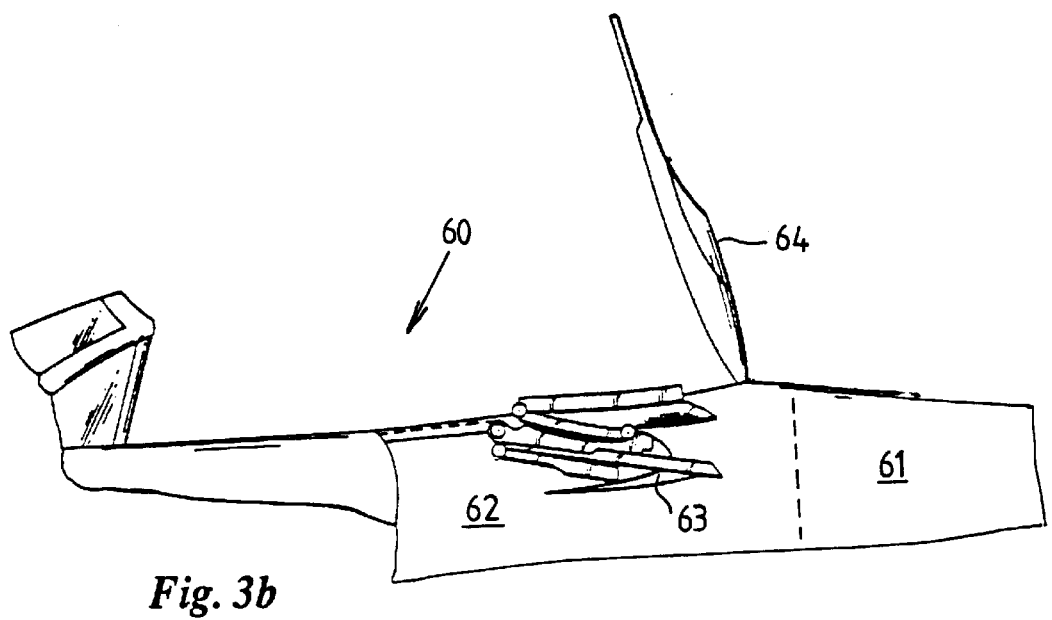
Figure 3C:
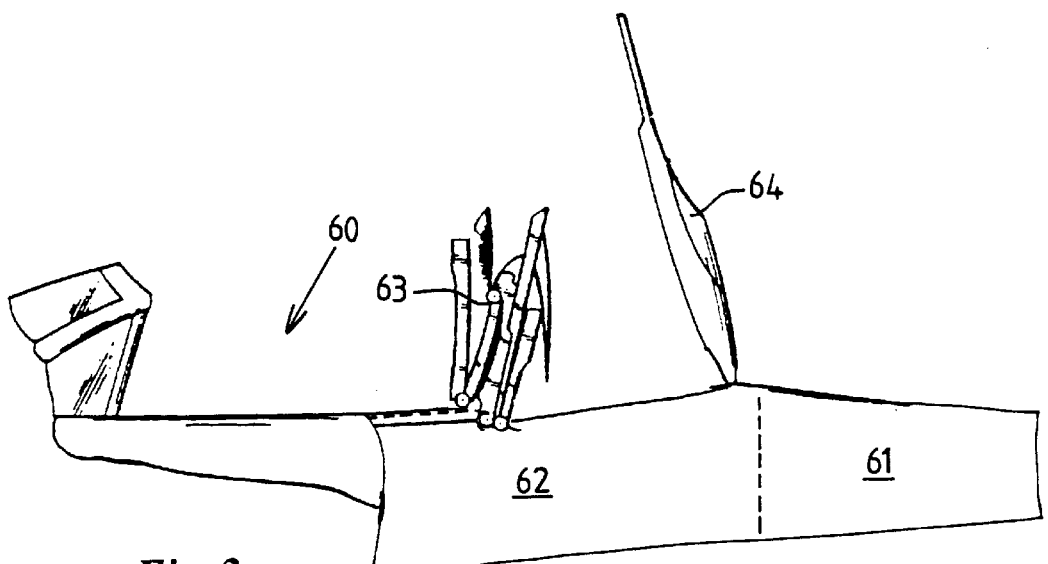

FIG. 3a shows a vehicle 60 having a boot 61, a compartment 62 for accommodating the open folding roof 63, and a pivottable tonneau cover 64 for covering the compartment 62. In this vehicle 60, between the boot 61 and the compartment 62 there is no partition or only a partition which is easy to break or remove. A design of this type is generally known from the prior art.

To drive the tonneau cover 64, the folding roof 63 and any associated locks (not shown), a drive assembly is provided, having actuators. The drive assembly has an emergency operating mode in which the tonneau cover 64 and the folding roof 63 can be moved by hand in order to allow the folding roof to be closed, for example in the event of the electric voltage failing. An embodiment of the drive assembly of this type is known.

If the vehicle 60 has been parked with the folding roof open as shown in FIG. 3a, a thief could then open the tonneau cover 64 (cf. FIG. 3b) and then pivot the folded-down folding roof 63 forwards as a single unit. In this way, it is then possible to gain access to the boot 61 and to steal goods which are present therein.

According to the invention, if suitable theft detection means observe that an attempted break-in is taking place, or at least there is a suspicion of such an attempt, for example because someone is bending over the vehicle, the actuators belonging to the tonneau cover and/or the folding roof are moved into their blocking position. As a result, it is then impossible for the corresponding vehicle component to be moved (further) in order to gain access to the boot 61.

It will be clear that the examples with reference to the drawing merely describe possible variants within the scope of the inventive idea and that numerous other variants are possible.

As an alternative to a folding roof, the moveable component as described in the appended claims may also be another component of a vehicle, for example a sliding roof, a boot lid, a bonnet, a door, a hatchback, etc.

Furthermore, instead of operating hydraulically the actuator may also operate electromechanically.

The recognition that an attempted theft is in progress may also be carried out in other ways than with the aid of a position sensor, for example using an ultrasound detector which detects whether the vehicle is being interfered with.

What is claimed is:

1. A drive assembly for driving a moveable component of a vehicle, which component can adopt a position in which the component prevents access to a part of the vehicle, the drive assembly comprising an actuator, which is coupled to the component and can provide a force f or moving the component, and a control unit for controlling the actuator, the drive assembly having an emergency operating mode, in which the actuator can move freely in at least one direction, and allows thereby a movement of the component caused by an external force being exerted on the component other than by the actuator, the drive assembly further being provided with a theft detection unit for detecting theft or attempted theft of the vehicle or of goods which are present in the vehicle, and the theft detection unit being coupled to the control unit, wherein the drive assembly is designed such that, if the drive assembly is in the emergency operating mode and the moveable component is in a position in which the component prevents access to a part of the vehicle, and then the theft detection unit detects theft or attempted theft, the emergency operating mode of the drive assembly is cancelled, and the drive assembly is then brought into a blocking mode, in which the actuator blocks any movement of the component caused by an external force being exerted on the component.

2. A drive assembly according to claim 1, in which the theft detection unit comprises a position sensor which is designed to recognize one or more positions of the component and is at least designed to recognize whether the component is being moved under the influence of an external force being exerted other than by the associated actuator.

3. A drive assembly according to claim 1, in which, in the blocking mode, the actuator passively or actively drives the moveable component towards the closed position.

4. A drive assembly according to claim 1, in which the actuator is a hydraulic actuator having a variable working chamber which, when hydraulic liquid is fed to the working chamber, brings about a movement of the component, the actuator having an associated actuable hydraulic valve which, in an open position, allows hydraulic fluid to flow out of the said working chamber and, in a closed position, blocks this flow out of the working chamber, and, in the emergency operating mode, the valve adopting a position in which hydraulic fluid can flow out of the working chamber and, in the blocking mode, the valve adopting a position which is such that movement of the component through external force being exerted on the component is blocked, since it is impossible for any hydraulic fluid to flow out of the corresponding working chamber.

5. A drive assembly according to claim 4, in which the valve, in the unenergized state, allows hydraulic fluid to flow out of the working chamber.

6. A drive assembly according to claim 4, in which the valve, in the unenergized state, allows hydraulic fluid to flow out of the working chamber and the valve is an electromagnetically operated valve.

7. A drive assembly according to claim 1, in which the moveable component is a closure element which can move between an open position and a closed position in order to open and close an opening in the vehicle body.

8. A drive assembly according to claim 1, in which the moveable component is a locking element which can move between an unlocked position and a locked position.

9. A vehicle provided with a drive assembly for driving a moveable component of the vehicle, which component can adopt a position in which the component prevents access to a part of the vehicle, the drive assembly comprising an actuator, which is coupled to the component and can provide a force for moving the component, and a control unit for controlling the actuator, the drive assembly having an emergency operating mode, in which the actuator can move freely in at least one direction, and allows thereby a movement of the component caused by an external force being exerted on the component other than by the actuator, the drive assembly further being provided with a theft detection unit for detecting theft and/or attempted theft of the vehicle and/or of goods which are present in the vehicle, and the theft detection unit being coupled to the control unit, wherein the drive assembly is designed such that, if the drive assembly is in the emergency operating mode and the moveable component is in a position in which the component prevents access to a part off the vehicle, and then the theft detection unit detects theft or attempted theft, the emergency operating mode of the drive assembly is cancelled, and the drive assembly is then brought into a blocking mode, in which the actuator blocks any movement of the component caused by an external force being exerted on the component.

10. A vehicle according to claim 9, which has a compartment for passengers, and the movable component is a component of a roof installation which is designed to at least partially cover the passenger compartment of the vehicle.

11. A method for preventing unauthorized access to a part of a vehicle, said vehicle having a drive assembly for driving a moveable component of the vehicle, which component can adopt a position in which the component prevents access to the part of the vehicle, the drive assembly comprising an actuator, which is coupled to the component and can provide a force for moving the component, and a control unit for controlling the actuator, the drive assembly having an emergency operating mode, in which the actuator can move freely in at least one direction, and allows thereby a movement of the component caused by an external force being exerted on the component other than by the actuator, the drive assembly further being provided with a theft detection unit for detecting theft or attempted theft of the vehicle or of goods which are present in the vehicle, and the theft detection unit being coupled to the control unit, wherein if the drive assembly is in the emergency operating mode and the moveable component is in a position in which the component prevents access to a part of the vehicle, and then the theft detection unit detects theft or attempted theft, the emergency operating mode of the drive assembly is cancelled, and the drive assembly is then brought into a blocking mode, in which the actuator blocks any movement of the component caused by an external force being exerted on the component.

* * * * *

UNITED STATES PATENT AND TRADEMARK OFFICE
CERTIFICATE OF CORRECTION

PATENT NO.    : 6,422,636 B2  Page 1 of 1
DATED         : July 23, 2002
INVENTOR(S)   : Mentink It is certified that error appears in the above-identified patent and that said Letters Patent is hereby corrected as shown below:

Column 5,
Line 17, "the limited" should be -- the said limited --.

Column 8,
Line 9, "part off" should be -- part of --.

Signed and Sealed this

Thirty-first Day of December, 2002

JAMES E. ROGAN
*Director of the United States Patent and Trademark Office*